(12) United States Patent
Sawada

(10) Patent No.: US 11,016,573 B2
(45) Date of Patent: May 25, 2021

(54) VEHICULAR INPUT APPARATUS

(71) Applicant: Panasonic Intellectual Property Management Co., Ltd., Osaka (JP)

(72) Inventor: Takateru Sawada, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 14 days.

(21) Appl. No.: 16/529,372

(22) Filed: Aug. 1, 2019

(65) Prior Publication Data
US 2019/0354193 A1 Nov. 21, 2019

Related U.S. Application Data

(63) Continuation of application No. PCT/JP2018/003932, filed on Feb. 6, 2018.

(30) Foreign Application Priority Data

Feb. 10, 2017 (JP) .............................. JP2017-022749

(51) Int. Cl.
*G06F 3/01* (2006.01)
*B60K 35/00* (2006.01)
(Continued)

(52) U.S. Cl.
CPC .............. *G06F 3/017* (2013.01); *B60K 35/00* (2013.01); *G06F 3/044* (2013.01); *B60K 37/06* (2013.01);
(Continued)

(58) Field of Classification Search
CPC ........ G06F 3/017; G06F 3/044; G06F 3/0416; G06F 2203/04108; B60K 35/00;
(Continued)

(56) References Cited

U.S. PATENT DOCUMENTS

2011/0126094 A1 5/2011 Horodezky et al.
2013/0090807 A1* 4/2013 Kojima .................. G06F 17/00
701/36
(Continued)

FOREIGN PATENT DOCUMENTS

JP 2013-512505 4/2013
JP 2014-527245 10/2014
(Continued)

OTHER PUBLICATIONS

International Search Report of PCT application No. PCT/JP2018/003932 dated Mar. 13, 2018.

*Primary Examiner* — Christopher E Leiby
(74) *Attorney, Agent, or Firm* — Greenblum & Bernstein, P.L.C.

(57) ABSTRACT

A vehicular input apparatus includes a gesture sensor, an external device controller, and an output stop unit. The gesture sensor detects a gesture that is a non-contact gesture. The external device controller outputs an operation signal corresponding to the gesture detected by the gesture sensor to a first external device. When the gesture sensor detects the gesture, the output stop unit causes the external device controller to stop outputting the operation signal in response to a detection signal from at least one of a contact sensor and a proximity sensor for manipulating a second external device. The external device controller outputs the operation signal to the first external device after a second predetermined period of time.

15 Claims, 7 Drawing Sheets

(51) Int. Cl.
*G06F 3/044* (2006.01)
*B60K 37/06* (2006.01)

(52) U.S. Cl.
CPC .. *B60K 2370/1468* (2019.05); *B60K 2370/70* (2019.05); *B60K 2370/77* (2019.05); *G06F 2203/04108* (2013.01)

(58) Field of Classification Search
CPC .... B60K 2370/1468; B60K 2370/1464; B60K 2370/15; B60K 2370/77; B60K 2370/70; B60K 37/06; B60R 16/02
See application file for complete search history.

(56) References Cited

U.S. PATENT DOCUMENTS

| | | | |
|---|---|---|---|
| 2013/0093719 A1* | 4/2013 | Tokutake | G06F 3/044 345/174 |
| 2014/0306814 A1* | 10/2014 | Ricci | G06F 3/0622 340/425.5 |
| 2015/0205521 A1 | 7/2015 | Ding et al. | |

FOREIGN PATENT DOCUMENTS

| | | |
|---|---|---|
| JP | 2014-215649 | 11/2014 |
| JP | 5812358 B | 11/2015 |
| WO | 2011/098496 | 8/2011 |
| WO | 2012/144217 | 10/2012 |
| WO | 2013/038293 | 3/2013 |
| WO | 2014/048180 | 4/2014 |

\* cited by examiner

VEHICULAR INPUT APPARATUS

CROSS-REFERENCE TO RELATED APPLICATIONS

This application is a continuation application of the PCT International Application No. PCT/JP2018/003932 filed on Feb. 6, 2018, which claims the benefit of foreign priority of Japanese patent application No. 2017-022749 filed on Feb. 10, 2017, the contents all of which are incorporated herein by reference.

BACKGROUND

1. Technical Field

The present disclosure relates to a vehicular input apparatus.

2. Description of the Related Art

There has been conventionally known an input apparatus that recognizes a gesture of an operator and performs an operation corresponding to the gesture. Japanese Translation of PCT International Application Publication No. 2013-512505 discloses an input apparatus that receives an additional gesture of an operator to modify an operation to be performed by the input apparatus. When the input apparatus recognizes an initial gesture and then an additional gesture, an operation corresponding to the initial gesture is modified based on a content corresponding to the additional gesture. For this reason, if the operator mistakes a gesture, the operator performs an additional gesture to modify an operation. It is thus possible to reduce an unintended operation.

SUMMARY

As described above, the input apparatus disclosed in PTL 1 is configured to recognize an additional gesture. A number of components of the input apparatus thus increases, so that the input apparatus becomes complicated.

An object of the present disclosure is to provide a vehicular input apparatus that reduces an unintended operation due to a gesture manipulation with a simple configuration.

A first vehicular input apparatus according to the present disclosure includes a gesture sensor, an external device controller, and an output stop unit. The gesture sensor detects a gesture that is a non-contact gesture. The external device controller outputs an operation signal corresponding to the gesture detected by the gesture sensor to a first external device. When the gesture sensor detects the gesture, the output stop unit causes the external device controller to stop outputting the operation signal in response to a detection signal from at least one of a contact sensor and a proximity sensor for manipulating a second external device. The external device controller outputs the operation signal to the first external device after a second predetermined period of time.

A second vehicular input apparatus according to the present disclosure includes a gesture sensor, a processor, and a memory. The gesture sensor detects a gesture that is a non-contact gesture. A program that can be executed by the processor is recorded in the memory. The processor performs a process of outputting an operation signal corresponding to the gesture detected by the gesture sensor to a first external device after a second predetermined period of time, at a time of execution of the program, and a process of stopping, when the gesture sensor detects the gesture, the process of outputting the operation signal in response to a detection signal from at least one of a contact sensor and a proximity sensor for manipulating a second external device.

DETAILED DESCRIPTION OF PREFERRED EMBODIMENTS

Exemplary embodiments will be described below in detail with reference to the accompanying drawings.

First Exemplary Embodiment (Configuration of Vehicular Input Apparatus 100)

Figure 1:
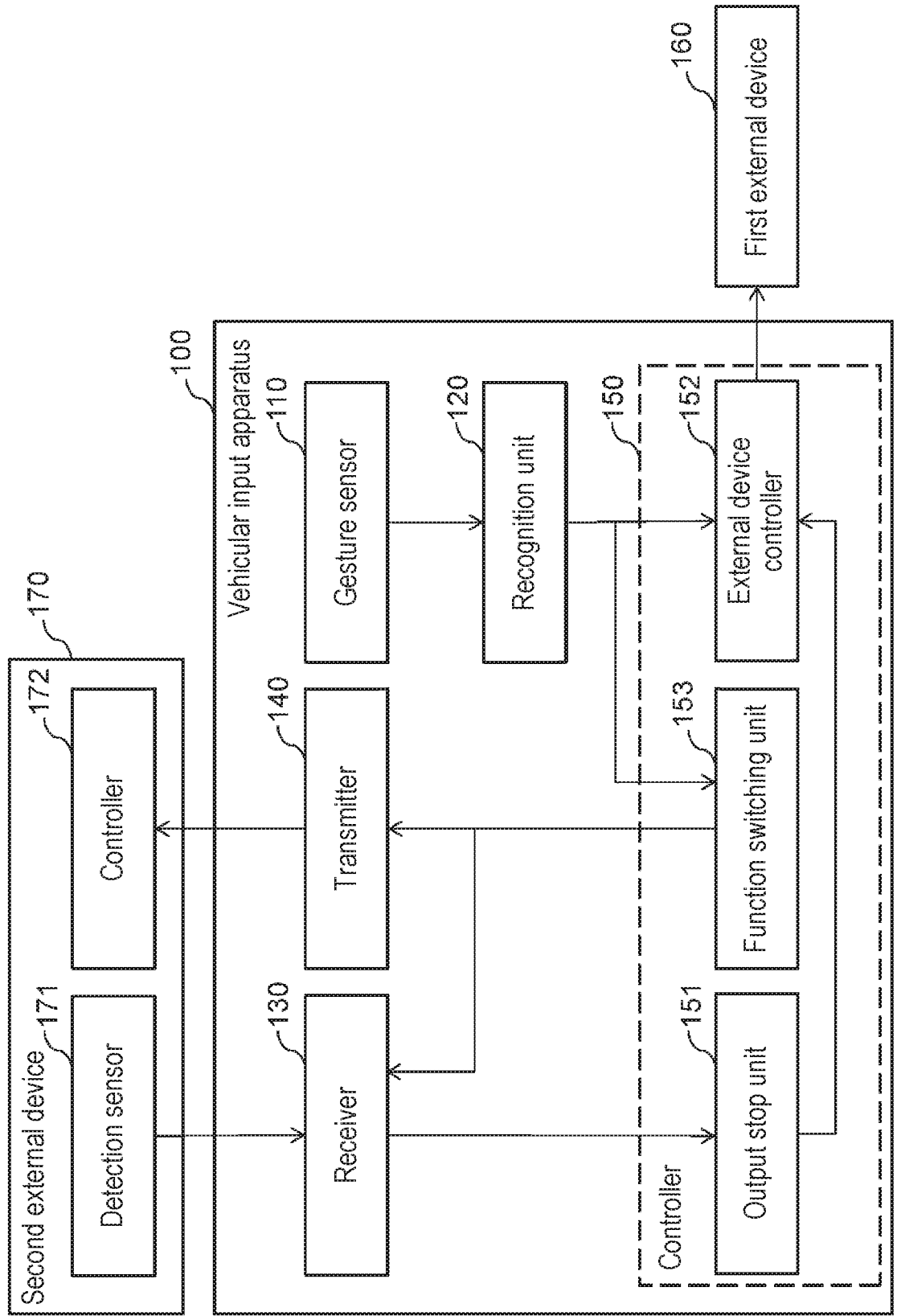
FIG. 1 is a block diagram illustrating a configuration of a vehicular input apparatus according to a first exemplary embodiment of the present disclosure.
Figure 2:
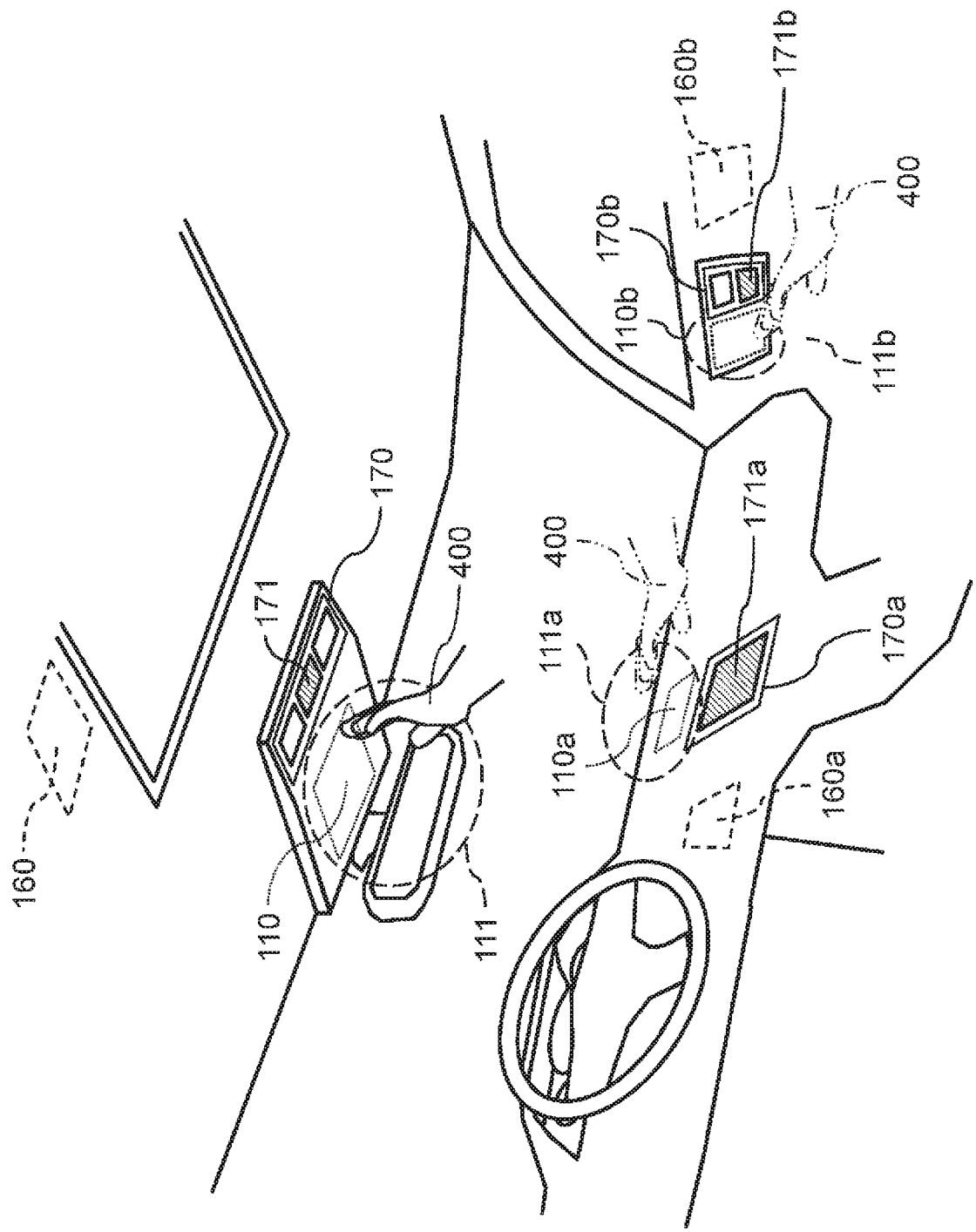
FIG. 2 illustrates an application example of the vehicular input apparatus illustrated in FIG. 1.

FIG. 1 is a block diagram illustrating a configuration of vehicular input apparatus 100 according to a first exemplary embodiment of the present disclosure. FIG. 2 illustrates an application example of vehicular input apparatus 100.

As illustrated in FIG. 1, vehicular input apparatus 100 includes gesture sensor 110, recognition unit 120, receiver 130, transmitter 140, and controller 150. Controller 150 includes output stop unit 151, external device controller 152, and function switching unit 153. Vehicular input apparatus 100 is electrically connected to first external device 160 and second external device 170. In FIG. 2, gesture detection area 111 of gesture sensor 110 is indicated by a broken line circle.

First external device 160 is, for example, an actuator for driving a sunroof to open and close the sunroof. First external device 160 is operated in response to an operation signal from external device controller 152.

Second external device 170 is, for example, a ceiling light. Second external device 170 includes detection sensor 171 and controller 172. Detection sensor 171 has at least one of a function as a contact sensor that detects operator's contact and a function as a proximity sensor that detects operator's proximity. Detection sensor 171 outputs a detection signal to receiver 130 to be described later. Controller 172 stops an operation of second external device 170 in response to a control signal from transmitter 140 to be described later.

An example of the contact sensor is a capacitive contact sensor that detects operator's contact by an amount of change in capacitance of electrodes. The contact sensor is not limited to the capacitive contact sensor and may be a pressure-sensitive sensor or a switch.

An example of the proximity sensor is a capacitive proximity sensor that detects operator's proximity by an amount of change in capacitance of electrodes. The proximity sensor is not limited to the capacitive proximity sensor, and may be an acoustic sensor, an infrared sensor, or an imaging device.

First external device 160 and second external device 170 are not limited to those described above, and may be other devices illustrated in FIG. 2. For example, first external device 160a may be an air conditioner, and second external device 170a may be a car navigation device. In this case, the air conditioner is configured to be controlled by gestures. Gesture sensor 110a is disposed above a screen of the car navigation device (second external device 170a), for example. In FIG. 2, gesture detection area 111a of gesture sensor 110a is indicated by a broken line circle. The car navigation device includes a contact sensor (detection sensor 171a) that is disposed on a front surface of the screen and is used to manipulate car navigation. Second external device 170a may be an audio device or a television, other than the car navigation device.

An example of the actuator, which is first external device 160, is a door lock actuator that drives a door lock mechanism of a door lock device (first external device 160b). An example of the actuator, which is second external device 170, is an actuator that raises and lowers a door glass of a power window device (second external device 170b). In this case, the door lock device is configured to be controlled by gestures. The door lock actuator of each door is driven in response to an operation signal from external device controller 152, so that each door lock is locked and unlocked. In FIG. 2, gesture detection area 111b of gesture sensor 110b placed on a door trim is indicated by a broken line circle. The power window device includes a contact sensor (detection sensor 171b) that is placed on the door trim and is used to manipulate a power window. Configurations of first external device 160 and second external device 170 are interchangeable. That is, first external device 160b may be a power window device and second external device 170b may be a door lock device. In this case, the power window is operated based on a detection result of gesture sensor 110b, and the door lock is operated based on a detection result of detection sensor 171b.

Gesture sensor 110 detects a gesture that an operator acts without touching to gesture sensor 110 in gesture detection area 111. Gesture sensor 110 is, for example, a capacitive gesture sensor. The capacitive gesture sensor includes a plurality of electrodes and measures a temporal change in capacitance of each electrode. The capacitive gesture sensor estimates that a gesture has been made when it is determined that a temporal change in capacitance is similar to a change that is defined in advance as a predetermined gesture.

While the capacitive gesture sensor is used as gesture sensor 110, gesture sensor 110 is not limited to the capacitive gesture sensor. Gesture sensor 110 may be an infrared gesture sensor, an acoustic gesture sensor, or a gesture sensor using an imaging device.

Recognition unit 120 is electrically connected to gesture sensor 110, external device controller 152, and function switching unit 153. Recognition unit 120 recognizes the non-contact gesture that the operator acts, based on an output from gesture sensor 110. Recognition unit 120 outputs gesture information about a recognized gesture to external device controller 152 and an electric signal to function switching unit 153.

Receiver 130 is electrically connected to detection sensor 171 of second external device 170, output stop unit 151, and function switching unit 153. Receiver 130 enables reception of a detection signal based on an output from function switching unit 153, which will be described later. Receiver 130 receives a detection signal relating to operator's contact or proximity from detection sensor 171 provided to manipulate second external device 170. Receiver 130 outputs a signal to cancel an operation of first external device 160 to output stop unit 151 in response to the detection signal from detection sensor 171.

Transmitter 140 is electrically connected to function switching unit 153 and controller 172 of second external device 170. Transmitter 140 transmits a control signal to invalidate a manipulation of second external device 170 to controller 172 of second external device 170 based on an output from function switching unit 153 until a first predetermined period of time elapses since recognition of a gesture by recognition unit 120.

Output stop unit 151 is electrically connected to receiver 130 and external device controller 152. When receiver 130 receives a detection signal relating to at least one of operator's contact and operator's proximity, receiver 130 outputs a cancel signal to output stop unit 151. When output stop unit 151 receives the cancel signal, output stop unit 151 outputs an operation stop signal to external device controller 152, so that external device controller 152 stops outputting an operation signal to first external device 160.

Function switching unit 153 is electrically connected to recognition unit 120, receiver 130, and transmitter 140. Function switching unit 153 enables receiver 130 to receive a detection signal in response to an electric signal from recognition unit 120. Receiver 130 thus starts to receive the detection signal.

FIG. 2 illustrates an example of a process performed by function switching unit 153. As illustrated in FIG. 2, first external device 160 is an actuator that drives a sunroof to open and close the sunroof, whereas second external device 170 is a manipulation panel of a ceiling light. Detection sensor 171 disposed on the manipulation panel of the ceiling light outputs a detection signal. When recognition unit 120 recognizes a gesture corresponding to opening or closing of the sunroof with operator's hand 400, function switching unit 153 enables receiver 130 to receive a detection signal. Receiver 130 thus starts to receive the detection signal. When receiving the detection signal from detection sensor 171, receiver 130 outputs a cancel signal to output stop unit 151.

External device controller 152 is electrically connected to recognition unit 120, output stop unit 151, and first external device 160. External device controller 152 outputs an operation signal corresponding to a gesture detected by gesture sensor 110 to first external device 160. Specifically, external device controller 152 outputs the operation signal corresponding to the gesture to first external device 160 based on gesture information output from recognition unit 120 through wired or wireless communication. When it is difficult to perform wired communication due to a configuration in which vehicular input apparatus 100 is far away from first external device 160, for example, wireless communication may be performed. As an example of the wireless communication, Bluetooth (Registered Trademark), infrared communication, and WiFi may be employed.

(Processing Operation of Vehicular Input Apparatus 100)

Figure 3:
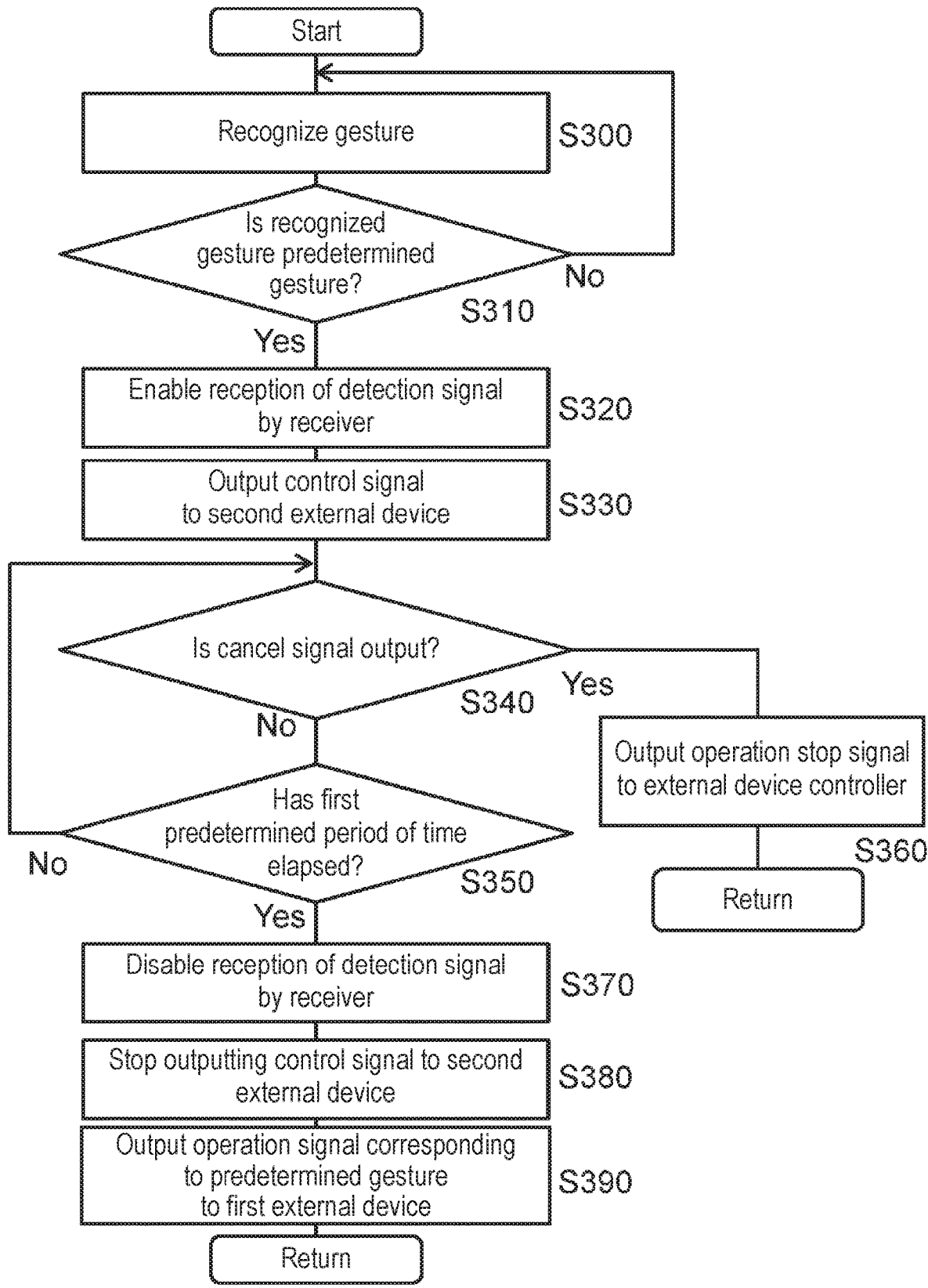
FIG. 3 is a flowchart of a processing operation performed by the vehicular input apparatus illustrated in FIG. 1.

A processing operation of vehicular input apparatus 100 will be described below. FIG. 3 is a flowchart of the processing operation performed by vehicular input apparatus 100.

Recognition unit 120 recognizes a gesture first (step S300).

Gesture sensor 110 detects a gesture, for example, a movement of operator's hand 400 such as holding hand 400 over gesture sensor 110. Recognition unit 120 recognizes the gesture based on an output from gesture sensor 110.

Next, recognition unit 120 determines whether the recognized gesture is a predetermined gesture (step S310). When recognition unit 120 determines that the recognized gesture is the predetermined gesture (Yes at step S310), function switching unit 153 enables reception of a detection signal by receiver 130 (step S320). Receiver 130 then starts to receive the detection signal. Transmitter 140 then outputs a control signal to stop a manipulation to controller 172 of second external device 170 (step S330). Controller 172 invalidates a manipulation of second external device 170 even if controller 172 detects a manipulation on detection sensor 171. For example, even if an operator performs a contact manipulation or a proximity manipulation on detection sensor 171 for the purpose of switching on or off a ceiling lamp (second external device 170), the ceiling lamp is not switched on or off.

When recognition unit 120 determines that the recognized gesture is not the predetermined gesture (No at step S310), vehicular input apparatus 100 performs processing from step S300 again.

Next, output stop unit 151 determines whether a cancel signal is output (step S340). The cancel signal is output from receiver 130 in response to the detection signal from detection sensor 171 when the contact manipulation or the proximity manipulation is performed on detection sensor 171 until a first predetermined period of time elapses. When output stop unit 151 determines that the cancel signal is output (Yes at step S340), output stop unit 151 outputs an operation stop signal to external device controller 152 (step S360), and the processing returns. Consequently, when the operator has made a gesture to manipulate first external device 160 but wants to cancel the manipulation, the operator may perform the contact manipulation or the proximity manipulation on detection sensor 171 for manipulating second external device 170 within the first predetermined period of time.

When output stop unit 151 determines that the cancel signal is not output (No at step S340), function switching unit 153 determines whether the first predetermined period of time has elapsed since recognition unit 120 determined that the recognized gesture was the predetermined gesture (step S350). When function switching unit 153 determines that the first predetermined period of time has elapsed (Yes at step S350), function switching unit 153 disables the reception of the detection signal by receiver 130 (step S370). Receiver 130 thus stops to receive the detection signal. Various periods of time such as 0.5 sec., 1 sec., and 2 sec. may be freely set as the first predetermined period of time.

Next, transmitter 140 stops to output a control signal to stop a manipulation to second external device 170 (step S380).

External device controller 152 then outputs an operation signal corresponding to the predetermined gesture to first external device 160 (step S390).

When function switching unit 153 determines that the first predetermined period of time has not elapsed (No at step S350), vehicular input apparatus 100 performs the processing from step S340 again.

The present exemplary embodiment has described a configuration in which the process at step S320 is performed and then the process at step S330 is performed. However, the process at step S330 may be performed first and then the process at step S320 may be performed. In addition, the present exemplary embodiment has described a configuration in which the process at step S380 is performed and then the process at step S390 is performed. However, the process at step S390 may be performed first and then the process at step S380 may be performed.

(Operations and Effects)

Vehicular input apparatus 100 achieves the following operations and effects.

Vehicular input apparatus 100 includes gesture sensor 110, external device controller 152, and output stop unit 151. Gesture sensor 110 detects a non-contact gesture. External device controller 152 outputs an operation signal corresponding to a gesture detected by gesture sensor 110 to first external device 160. When gesture sensor 110 detects a gesture, output stop unit 151 stops outputting an operation signal in response to a detection signal from detection sensor 171 for the purpose of manipulating second external device 170.

The manipulation of suspending an operation corresponding to a gesture is performed by detection sensor 171 of second external device 170. The manipulation of suspending an operation corresponding to an unintended gesture of an operator can thus be performed at a location that the operator can immediately touch or become proximate to (for example, a location of detection sensor 171 illustrated in FIG. 2). Consequently, it is not necessary to separately provide a detection sensor that detects the manipulation of suspending an operation corresponding to a gesture in vehicular input apparatus 100. This configuration prevents a configuration of vehicular input apparatus 100 from being complicated. Therefore, it is possible to simplify vehicular input apparatus 100 and at the same time, reduce an unintended operation due to a gesture manipulation.

Receiver 130 stops to receive a detection signal when a first predetermined period of time has elapsed since the gesture sensor detected a gesture.

It is thus possible to reduce a cancel input that is not intended by the operator. For example, if detection sensor 171 is able to detect the manipulation until an operation of first external device 160 is completed, the possibility that detection sensor 171 may detect a cancel input that is not intended by the operator increases. For this reason, the first predetermined period of time is set. When the first predetermined period of time has elapsed, function switching unit 153 disables reception of a detection signal and receiver 130 stops to receive a detection signal. It is thus possible to reduce a cancel input that is not intended by the operator.

External device controller 152 outputs an operation signal to first external device 160 after a second predetermined period of time. The second predetermined period of time may be equal to the first predetermined period of time or may be longer than the first predetermined period of time.

If gesture recognition that is not intended by the operator is made, it is possible to reduce operator's stress due to an immediate operation of a device that is not intended by the operator (first external device 160). In addition, it is possible to reduce an unintended wrong manipulation that is performed by the operator according to a manipulation of suspending an operation corresponding to a gesture. For example, when recognition unit 120 recognizes a gesture and at the same time first external device 160 starts to operate, the operator feels stressed by the operation of first external device 160 due to the unintended gesture recognition. In particular, when the operation of first external device 160 is an operation of a movable part that includes an operation of an actuator such as an opening or closing operation of a sunroof, it takes time for the operation generated to return to its initial state. This makes the operator feel more stressed. The operator tends to quickly perform a suspend manipulation to cancel the operation corresponding to the gesture. In this case, if the operator quickly performs the suspend manipulation, the operator may perform the suspend manipulation itself incorrectly. For this reason, first external device 160 starts to operate after the second predetermined period of time. The operator is thus able to suspend an operation of a device due to unintended gesture recognition in advance, which reduces manipulating stress. Moreover, the operator is able to perform the suspend manipulation in a relaxed mood, and thus it is possible to reduce an unintended wrong manipulation performed by the operator according to the suspend manipulation.

Vehicular input apparatus 100 further includes transmitter 140 that transmits a control signal to stop a manipulation of second external device 170 by detection sensor 171 to second external device 170 until the first predetermined period of time elapses since gesture sensor 110 detected a gesture.

It is thus possible to reduce an operation that is not intended by the operator. For example, while detection sensor 171 on a manipulation panel of a ceiling light, which is second external device 170, detects an input of cancelling the opening or closing operation of the sunroof, the manipulation of the ceiling light using second external device 170 stops. It is thus possible to reduce an unintended operation such as an action of switching on the ceiling light by mistake instead of making an input of cancelling the opening or closing operation of the sunroof.

The detection signal is detected by a capacitive contact sensor that detects operator's contact.

The operator can thus handle an unintended operation immediately. For example, when a switch is used as the contact sensor, the operator has to press the switch. For this reason, it may be difficult for the operator to instantly cancel an unintended operation. On the other hand, when the capacitive contact sensor is used, the operator can immediately handle an unintended operation only by touching the contact sensor.

The detection signal is also detected by a capacitive proximity sensor that detects operator's proximity.

It is thus possible to prevent the proximity sensor from outputting a wrong cancel signal. For example, if an imaging device is used as the proximity sensor, the proximity sensor may recognize image data wrongly and thus perform wrong detection. On the other hand, the capacitive proximity sensor has enhanced detection accuracy to reduce outputting a wrong cancel signal.

Gesture sensor 110 detects a gesture with a capacitive system.

It is thus possible to reduce an operation that is not intended by the operator. For example, if an imaging device is used as gesture sensor 110, recognition unit 120 may recognize image data wrongly and thus recognize a wrong gesture. On the other hand, the capacitive gesture sensor enhances accuracy of gesture information acquired to reduce an unintended operation.

While it is configured to include transmitter 140 that transmits a control signal to second external device 170, transmitter 140 may be eliminated.

Consequently, in a case where a gesture that is not intended by the operator is recognized, if detection sensor 171 is manipulated within a first predetermined period of time, first external device 160 stops to operate. At the same time, second external device 170 is operated. When it is configured to connect second external device 170 (for example, an air conditioner) that does not irritate the operator when being operated to vehicular input apparatus 100, transmitter 140 may be eliminated.

(Modification of First Exemplary Embodiment)

Figure 4:
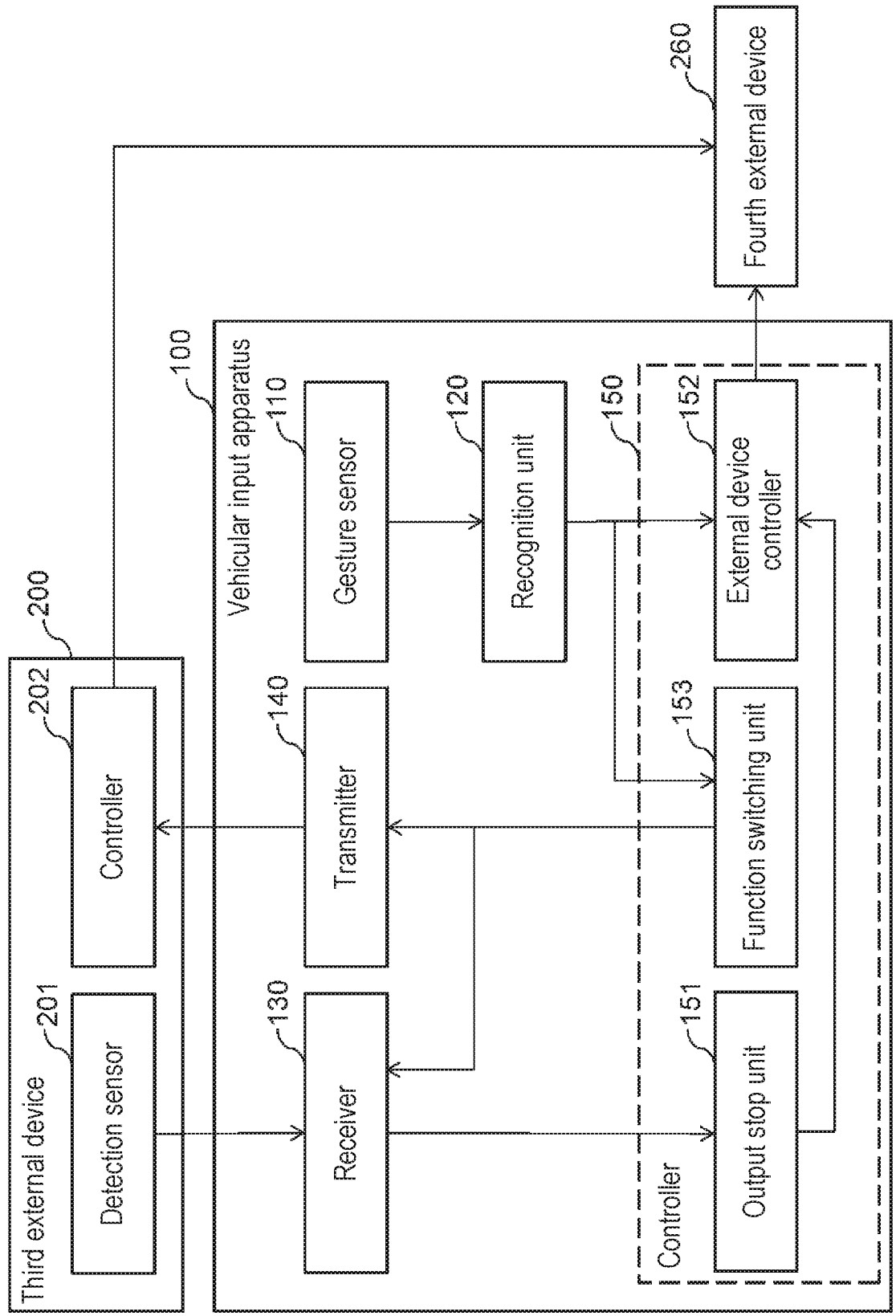
FIG. 4 is a block diagram illustrating a configuration of a vehicular input apparatus according to a modification of the first exemplary embodiment of the present disclosure.
Figure 5:
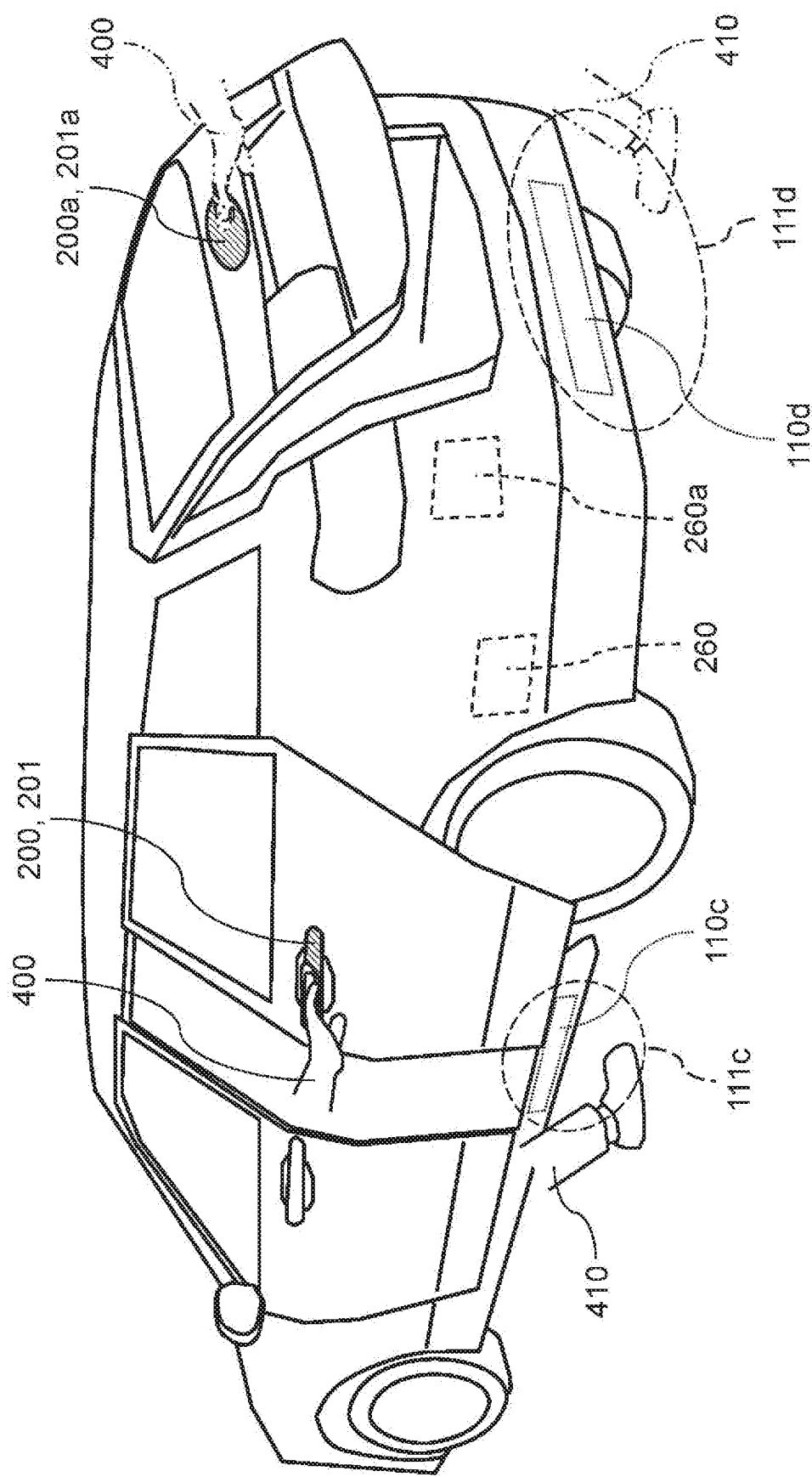
FIG. 5 illustrates an application example of the vehicular input apparatus illustrated in FIG. 4.

A configuration of vehicular input apparatus 100 according to a modification of the first exemplary embodiment will be described. FIG. 4 is a block diagram of vehicular input apparatus 100. FIG. 5 is an explanatory view of an application example of vehicular input apparatus 100. In vehicular input apparatus 100, external device controller 152 is electrically connected to fourth external device 260, and third external device 200 is electrically connected to fourth external device 260. That is, fourth external device 260 according to the modification corresponds to first external device 160 and third external device 200 controls fourth external device 260. A configuration different from the configuration illustrated in FIG. 1 will be described below, and a description of similar configurations will be omitted.

Vehicular input apparatus 100 has a function of recognizing a gesture of an operator's foot to open or close a slide door. As an example, third external device 200 (corresponding to second external device 170) is an electrostatic switch that is installed at a door handle and used to open and close a slide door. As an example, fourth external device 260 (corresponding to first external device 160) is a power slide door device that includes an actuator for driving the slide door. In this case, the power slide door device is configured to be controlled by gestures. Gesture sensor 110c is disposed under the slide door, for example. In this configuration, gesture detection area 111c of gesture sensor 110c where a gesture of foot 410 is detected is indicated by a broken line circle in FIG. 5. Fourth external device 260 opens and closes the slide door in response to not only an operation signal from third external device 200 but also an operation signal from external device controller 152. Third external device 200 includes detection sensor 201 and controller 202.

Fourth external device 260a (corresponding to first external device 160) may be a power rear gate device and third external device 200a (corresponding to second external device 170) may be a rear gate switch. In this case, the power rear gate device is configured to be controlled by gestures. Gesture sensor 110d is disposed in a lower part of a rear bumper, for example. In this configuration, gesture detection area 111d of gesture sensor 110d where a gesture of foot 410 is detected is indicated by a broken line circle in FIG. 5. The power rear gate device includes a contact sensor (detection sensor 201a) that is disposed on the rear gate to open and close the rear gate.

Function switching unit 153 enables reception of a detection signal by receiver 130 in response to an electric signal from recognition unit 120. Receiver 130 thus starts to receive the detection signal. FIG. 5 illustrates an example of an operation performed by function switching unit 153. As described above, third external device 200 is an electrostatic switch that is installed at the door handle and used to open and close the slide door. When recognition unit 120 recognizes a gesture corresponding to opening or closing of the slide door with operator's foot 410, function switching unit 153 enables receiver 130 to receive a detection signal from detection sensor 201 provided in third external device 200. Receiver 130 thus starts to receive the detection signal. When receiving the detection signal from detection sensor 201, receiver 130 outputs a cancel signal to output stop unit 151. In the present modification, the slide door can be opened or closed by approaching operator's hand 400 to the door handle. The slide door can also be opened or closed by a gesture operation of operator's foot 410. If an operation of opening or closing the slide door by operator's foot 410, which is not intended by the operator, is recognized, the operator instantly touches the door handle by the hand, thus suspending the opening or closing operation before the slide door is opened or closed.

Second Exemplary Embodiment (Configuration of Vehicular Input Apparatus 300)

Figure 6:
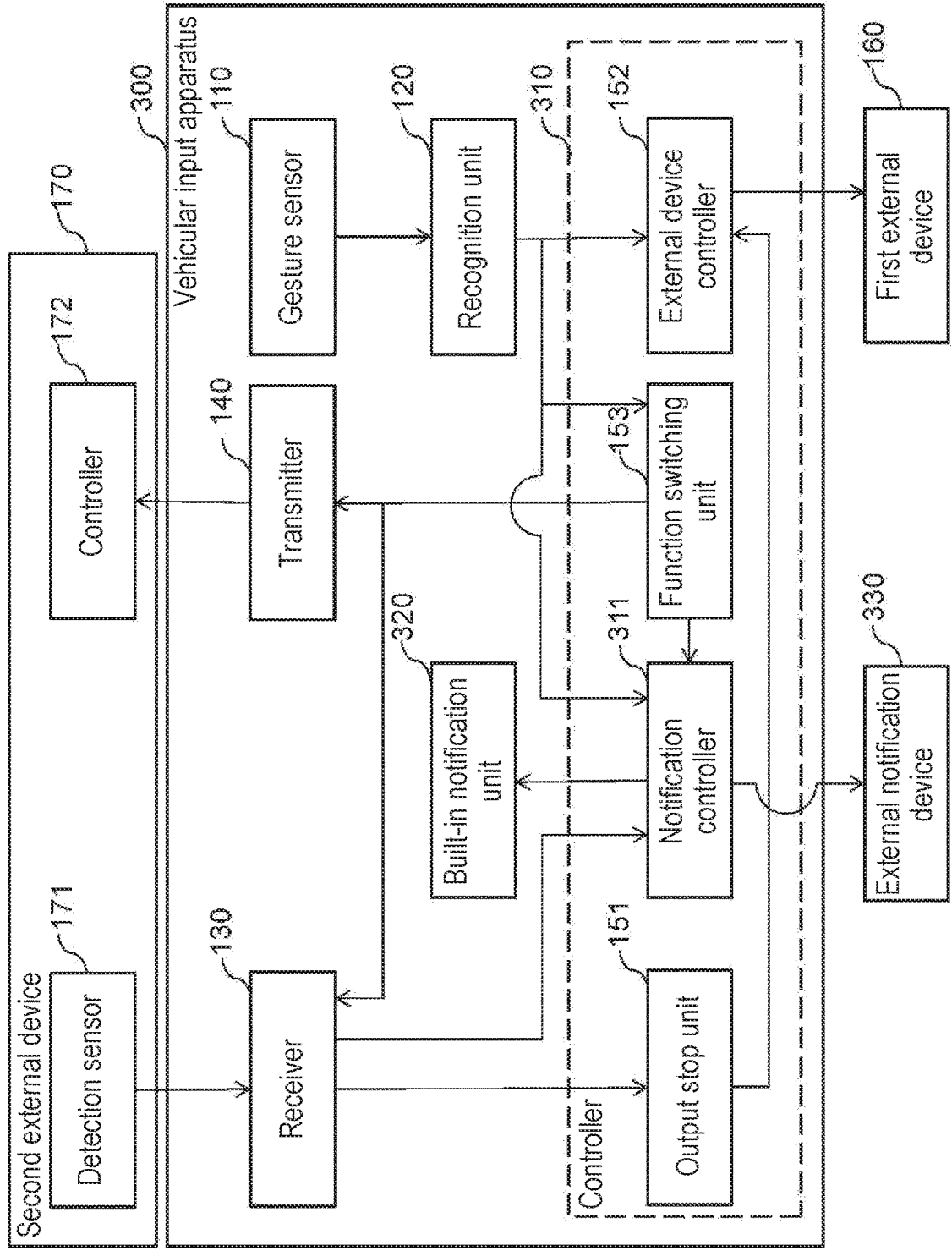
FIG. 6 is a block diagram of a vehicular input apparatus according to a second exemplary embodiment of the present disclosure.

A configuration of vehicular input apparatus 300 according to a second exemplary embodiment will be described. FIG. 6 is a block diagram of a configuration of vehicular input apparatus 300. Vehicular input apparatus 300 includes, in addition to the configuration of vehicular input apparatus 100 according to the first exemplary embodiment, notification controller 311 that is added to controller 310 for the purpose of notifying an operator of operation information of first external device 160 and built-in notification unit 320. Notification controller 311 is electrically connected to external notification device 330. A configuration different from the configuration of the first exemplary embodiment will be described below, and a description of similar configurations will be omitted.

Notification controller 311 is electrically connected to recognition unit 120, receiver 130, built-in notification unit 320, and external notification device 330.

Built-in notification unit 320 and external notification device 330 notify an operator of operation information of first external device 160 according to an output from notification controller 311. Hereinafter, built-in notification unit 320 and external notification device 330 will collectively be referred to as a "notification device". Vehicular input apparatus 300 according to the present exemplary embodiment may be configured to include one of built-in notification unit 320 and external notification device 330. The notification device is, for example, a speaker and is capable of notifying an operator of operation information by sound and voice. The operation information notified by the notification device indicates, for example, an operation content of first external device 160. Alternatively, the operation information may be information about elapse of a first predetermined period of time during which an operation of first external device 160 can be cancelled or cancel information to notify an operator that the operation of first external device 160 has been cancelled.

Notification controller 311 controls the notification device based on an output from recognition unit 120. For example, when notification controller 311 outputs the operation information of first external device 160 to the notification device, the notification device outputs a voice message such as "A gesture of unlocking a door lock has been recognized. Cancellation is possible within two seconds". That is, the notification device notifies an operator of the operation content of first external device 160 and the first predetermined period of time during which the operation of first external device 160 can be cancelled. Notification controller 311 also controls the notification device based on an output from receiver 130. For example, when notification controller 311 outputs the cancel information of first external device 160 to the notification device, the notification device outputs a voice message such as "An operation of unlocking a door lock has been cancelled". That is, the notification device notifies an operator that the operation of first external device 160 has been cancelled. Notification controller 311 also controls the notification device based on an output from function switching unit 153. For example, when notification controller 311 outputs the information of elapse of the first predetermined period of time to the notification device, the notification device outputs a voice message such as "Cancelable time has elapsed. A door lock will be unlocked". That is, the notification device notifies an operator of the elapse of the first predetermined period of time and the operation content of first external device 160 to be performed thereafter.

In other examples, the notification device is a display device. For example, by displaying characters and graphic information on a display, information can be visually notified to a driver.

(Operation of Vehicular Input Apparatus 300)

An operation of vehicular input apparatus 300 will be described below. The operation of vehicular input apparatus 300 is different from the operation of vehicular input apparatus 100 according to the first exemplary embodiment in that a notification device makes a notification to an operator. A configuration different from the configuration of the first exemplary embodiment will be described below, and a description of similar configurations will be omitted.

Figure 7:
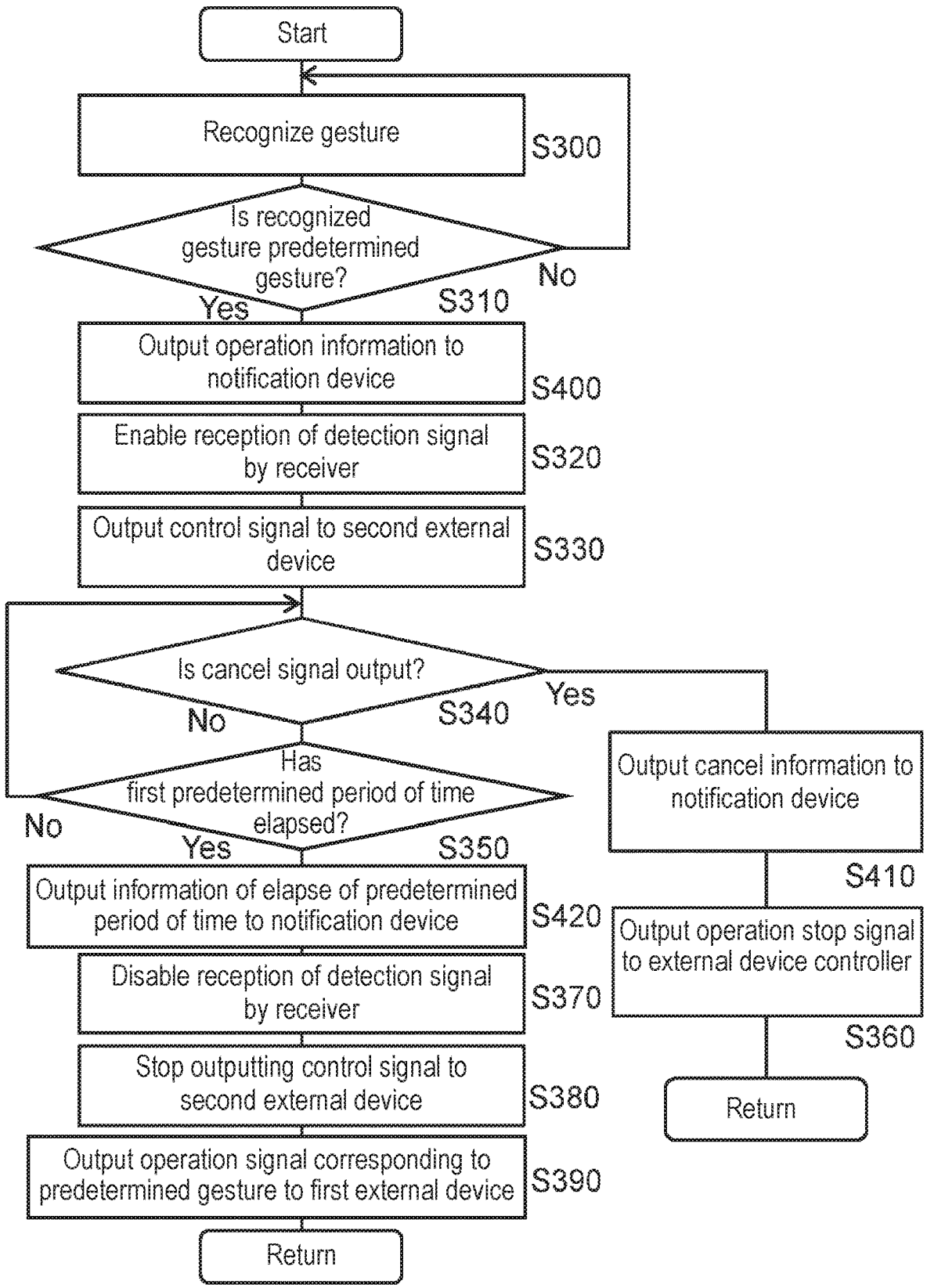
FIG. 7 is a flowchart of a processing operation performed by the vehicular input apparatus illustrated in FIG. 6.

FIG. 7 is a flowchart of an operation of vehicular input apparatus 300.

A process at step S300 is similar to that of the first exemplary embodiment, and thus a description thereof will be omitted.

Recognition unit 120 determines whether a recognized gesture is a predetermined gesture (step S310). When recognition unit 120 determines that the recognized gesture is the predetermined gesture (Yes at step S310), notification controller 311 outputs operation information to the notification device (step S400).

Specifically, notification controller 311 outputs the operation information of first external device 160 to the notification device. The notification device notifies an operator of the operation information by voice and display, for example.

When recognition unit 120 determines that the recognized gesture is not the predetermined gesture (No at step S310), vehicular input apparatus 300 performs processing from step S300 again.

Processes at step S320 and step S330 are similar to those of the first exemplary embodiment, and thus a description thereof will be omitted.

Next, output stop unit 151 determines whether a cancel signal is output (step S340). When output stop unit 151 determines that the cancel signal is output (Yes at step S340), notification controller 311 outputs cancel information to the notification device (step S410).

Specifically, notification controller 311 outputs information to cancel the operation of first external device 160 to the notification device. The notification device notifies the operator of the cancel information by voice and display, for example.

A process at step S360 is similar to that of the first exemplary embodiment, and thus a description thereof will be omitted.

Next, function switching unit 153 determines whether a first predetermined period of time has elapsed since the recognized gesture was determined to be the predetermined gesture (step S350). When function switching unit 153 determines that the first predetermined period of time has elapsed (Yes at step S350), notification controller 311 outputs information of elapse of the first predetermined period of time to the notification device (step S420).

Specifically, notification controller 311 outputs the information of elapse of the first predetermined period of time to the notification device. The notification device notifies the operator of the information of elapse of the first predetermined period of time and the operation content of first external device 160 to be performed thereafter by voice and display, for example.

The processes at steps S370 to step S390 are similar to those of the first exemplary embodiment, and thus a description thereof will be omitted.

The present exemplary embodiment has described a configuration in which after the process at step S420, the processes at step S370, step S380, and step S390 are successively performed. However, an order of these processes is not limited to this order. For example, it may be configured that the process at step S420 is performed, the process at step S380 is then performed, and finally the processes at step S370 and step S390 are successively performed.

(Operations and Effects)

Vehicular input apparatus 300 achieves the following operations and effects.

Vehicular input apparatus 300 further includes notification controller 311 that operates a notification device that notifies an operator of operation information of first external device 160.

When notification controller 311 outputs the operation information to the notification device, the notification device notifies the operator of an operation content of first external device 160 and a first predetermined period of time during which the operation of first external device 160 can be cancelled by voice and display. Consequently, the operator can recognize the operation content of first external device 160 and the first predetermined period of time, for example.

When notification controller 311 outputs cancel information of first external device 160 to the notification device, the notification device notifies the operator that the operation content of first external device 160 has been cancelled by voice and display, for example. Consequently, the operator can recognize that the operation of first external device 160 has been cancelled.

When notification controller 311 outputs information of elapse of the first predetermined period of time to the notification device, the notification device notifies the operator of the elapse of the first predetermined period of time and the operation content of first external device 160 to be performed thereafter by voice and display, for example. Consequently, the operator can recognize the elapse of the first predetermined period of time and the operation content of first external device 160.

Other Exemplary Embodiments

The configuration of the present disclosure has been described based on the first and second exemplary embodiments and modifications thereof. However, the present disclosure is not limited to the exemplary embodiments described above. For example, some parts of configurations of vehicular input apparatuses 100 and 300 may be appropriately combined to constitute a vehicular input apparatus. The configurations of vehicular input apparatuses 100 and 300 may be appropriately changed within the scope of technical idea of the present disclosure.

For example, detection sensor 171 of second external device 170 may be a single capacitive sensor that has both a function of proximity detection and a function of contact detection. In addition, receiver 130 may be configured to receive detection signals not only from single detection sensor 171 but also a plurality of detection sensors 171.

For example, when an operator makes a gesture, the operator may bring hand 400 closer to gesture sensor 110. In this case, detection sensor 171 of second external device 170 near gesture sensor 110 detects proximity of the operator. If output stop unit 151 outputs a cancel signal to cancel the recognized gesture, first external device 160 stops to operate even though a correct gesture manipulation is performed, which is not convenient for the operator. For this reason, when receiver 130 receives a detection signal at least twice in a first predetermined period of time, output stop unit 151 causes external device controller 152 to stop outputting an operation signal to first external device 160. Output stop unit 151 can thus obtain a correct cancel signal. Alternatively, when detection sensor 171 detects the proximity of the operator at least twice, detection sensor 171 may output a cancel signal to output stop unit 151.

A capacitive gesture sensor has a function as at least one of a contact sensor and a proximity sensor. In this case, gesture sensor 110 is configured to be electrically connected to receiver 130 and thus detection sensor 171 is eliminated.

The capacitive gesture sensor functions as a plurality of sensors, and thus detection sensor 171 is eliminated. As a result, it is possible to effectively use an empty space.

In vehicular input apparatuses 100 and 300, respective functional blocks such as controllers 150 and 310, output stop unit 151, function switching units 153, external device controller 152, and notification controller 311 may be individually made into a single chip by a semiconductor device such as an LSI (large-scale integrated circuit), or may be entirely or partially made into a single chip. Each functional block may be configured to include some functions of other functional blocks. For example, while function switching unit 153 determines whether a first predetermined period of time has elapsed in the first and second exemplary embodiments, receiver 130 and transmitter 140 may make such a determination.

Processing of each functional block may be entirely or partially implemented by a computer program. Each piece of processing may be implemented by hardware, or may be implemented by software (in some cases, implemented with an operating system (OS), middleware, or a predetermined library). Each piece of processing may be performed by a combination of the hardware and the software. When each functional block is implemented by a computer program, an operation of the functional block is processed by a processor that executes the computer program.

An order of performing processing methods is not limited to that described in the above exemplary embodiments, and may be interchanged within the subject matter of the present disclosure.

Processing methods performed by vehicular input apparatuses 100 and 300, a computer program that enables a computer to perform the processing methods, and a computer-readable recording medium having the program recorded therein are included in the scope of the present disclosure. Example of the computer-readable recording medium include a flexible disk, a hard disk, a compact disk (CD)-ROM, a magneto-optical disk (MO), a digital versatile disk (DVD), a DVD-ROM, a DVD-RAM, a Blu-ray (Registered Trademark) disk (BD), and a semiconductor memory. The computer program is not limited to those recorded in such recording media, and may be transmitted via a telecommunications line, a wireless or wired communication line, a network represented by the Internet, and the like.

A signal receiver includes a signal receiving circuit, a memory, and a timer, for example. The signal receiver has a function of receiver 130 described above.

A signal transmitter includes a signal transmitting circuit, for example. The signal transmitter has a function of transmitter 140 described above.

As described above, the present disclosure is applicable to a vehicular input apparatus.

What is claimed is:

1. A vehicular input apparatus comprising:
   a gesture sensor that detects a gesture that is a non-contact gesture;
   an external device controller that outputs an operation signal corresponding to the gesture detected by the gesture sensor to a first external device; and
   an output stop circuit that, when the gesture sensor detects the gesture, causes the external device controller to stop outputting the operation signal to the first external device in response to a detection signal from at least one of a contact sensor and a proximity sensor for manipulating a second external device,
   wherein
      a manipulation of the second external device by the detection signal from at least one of the contact sensor and the proximity sensor is stopped when the gesture sensor detects the gesture,
      the manipulation of the second external device by the detection signal from at least one of the contact sensor and a proximity sensor is not stopped when the gesture sensor does not detect the gesture,
      the gesture sensor is spaced away from the second external device,
      the second external device provides an output operation detectable by a user, and
      the first external device and the second external device is one of a sunroof actuator, a vehicle light, an air conditioner, a navigation device, an audio device, a display device, a door lock actuator, or a window actuator.

2. The vehicular input apparatus according to claim 1, further comprising a receiver that receives the detection signal,
   wherein the receiver stops to receive the detection signal when a predetermined period of time has elapsed since detection of the gesture by the gesture sensor.

3. The vehicular input apparatus according to claim 2, further comprising a transmitter that transmits a control signal to stop a manipulation of the second external device by the contact sensor or the proximity sensor to the second external device until the predetermined period of time elapses since detection of the gesture by the gesture sensor.

4. The vehicular input apparatus according to claim 1, further comprising a receiver that receives the detection signal,
   wherein
      when the receiver receives the detection signal at least twice in a predetermined period of time,
      the output stop circuit stops the external device controller from outputting the operation signal to the first external device.

5. The vehicular input apparatus according to claim 1, wherein the gesture sensor detects the gesture with a capacitive system.

6. The vehicular input apparatus according to claim 5, wherein the gesture sensor of the capacitive system has a function as at least one of the contact sensor and the proximity sensor.

7. The vehicular input apparatus according to claim 1, further comprising a notification controller that operates a notification device that notifies an operator of operation information of the first external device.

8. A vehicular input apparatus comprising:
   a gesture sensor that detects a gesture that is a non-contact gesture;
   a processor; and
   a memory that records a program executable by the processor,
   wherein
      the processor performs a process of outputting an operation signal corresponding to the gesture detected by the gesture sensor to a first external device, at a time of execution of the program, and
      a process of stopping, when the gesture sensor detects the gesture, the process of outputting the operation signal to the first external device in response to a detection signal from at least one of a contact sensor and a proximity sensor for manipulating a second external device,
   wherein
      a manipulation of the second external device by the detection signal from at least one of the contact sensor and the proximity sensor is stopped when the gesture is detected by the gesture sensor,
      the manipulation of the second external device by the detection signal from at least one of the contact sensor and a proximity sensor is not stopped when the gesture is not detected by the gesture sensor,
      the gesture sensor is spaced away from the second external device,
      the second external device provides an output operation detectable by a user, and
      the first external device and the second external device is one of a sunroof actuator, a vehicle light, an air conditioner, a navigation device, an audio device, a display device, a door lock actuator, or a window actuator.

9. The vehicular input apparatus according to claim 8, further comprising a signal receiver that receives the detection signal,
   wherein the processor performs a process of stopping the signal receiver from receiving the detection signal when a predetermined period of time has elapsed since detection of the gesture by the gesture sensor.

10. The vehicular input apparatus according to claim 9, further comprising a signal transmitter that transmits a control signal to stop a manipulation of the second external device by at least one of the contact sensor and the proximity sensor to the second external device,
    wherein the processor performs a process of controlling the signal transmitter to transmit the control signal to the second external device until the predetermined period of time elapses since detection of the gesture by the gesture sensor.

11. The vehicular input apparatus according to claim 8, further comprising a signal receiver that receives the detection signal,
    wherein the processor performs a process of stopping a process of outputting the operation signal to the first external device when the signal receiver receives the detection signal at least twice in a predetermined period of time.

12. The vehicular input apparatus according to claim 8, wherein the gesture sensor detects the gesture with a capacitive system.

13. The vehicular input apparatus according to claim 12, wherein the gesture sensor of the capacitive system has a function as at least one of the contact sensor and the proximity sensor.

14. The vehicular input apparatus according to claim 8, wherein the processor performs a process of operating a notification device that notifies an operator of operation information of the first external device.

15. The vehicular input apparatus according to claim 2, further comprising a function switching circuit,
   wherein the function switching circuit enables the receiver to receive the detection signal when the gesture sensor detects the gesture.

* * * * *